US006141695A

United States Patent [19]
Sekiguchi et al.

[11] Patent Number: 6,141,695
[45] Date of Patent: Oct. 31, 2000

[54] EMAIL SYSTEM CONVERTS EMAIL DATA TO A DIFFERENT FORMAT ACCORDING TO PROCESSING MODE INFORMATION SET IN MEMORY IN CORRESPONDENCE WITH POST OFFICE INFORMATION

[75] Inventors: Kenzou Sekiguchi, Machida; Toru Maeda, Mitaka, both of Japan

[73] Assignee: Canon Kabushiki Kaisha, Tokyo, Japan

[21] Appl. No.: 08/982,466

[22] Filed: Dec. 2, 1997

[30] Foreign Application Priority Data

Dec. 4, 1996 [JP] Japan .................................. 8-324047

[51] Int. Cl.[7] .................................................. G06F 15/16
[52] U.S. Cl. ........................................ 709/246; 709/206
[58] Field of Search ................................ 709/206, 207, 709/103, 246; 345/333; 455/26.1

[56] References Cited

U.S. PATENT DOCUMENTS

| 5,377,354 | 12/1994 | Scannell et al. | 709/103 |
|---|---|---|---|
| 5,493,692 | 2/1996 | Theimer et al. | 455/26.1 |
| 5,657,461 | 8/1997 | Harkins et al. | 345/333 |
| 5,675,507 | 10/1997 | Bobo, II | 709/206 |
| 5,689,642 | 11/1997 | Harkins et al. | 709/207 |

*Primary Examiner*—Le Hien Luu
*Attorney, Agent, or Firm*—Fitzpatrick, Cella, Harper & Scinto

[57] ABSTRACT

In a communication apparatus having the function of retrieving electronic mail data from an e-mail server of a local area network or the Internet, a setting function for setting the processing mode of e-mail data in advance and a processing function for automatically processing the e-mail data retrieved by a retrieving function in a processing mode set by the setting function are arranged, so that the retrieved e-mail data can be automatically processed without any operation performed by an operator.

40 Claims, 18 Drawing Sheets

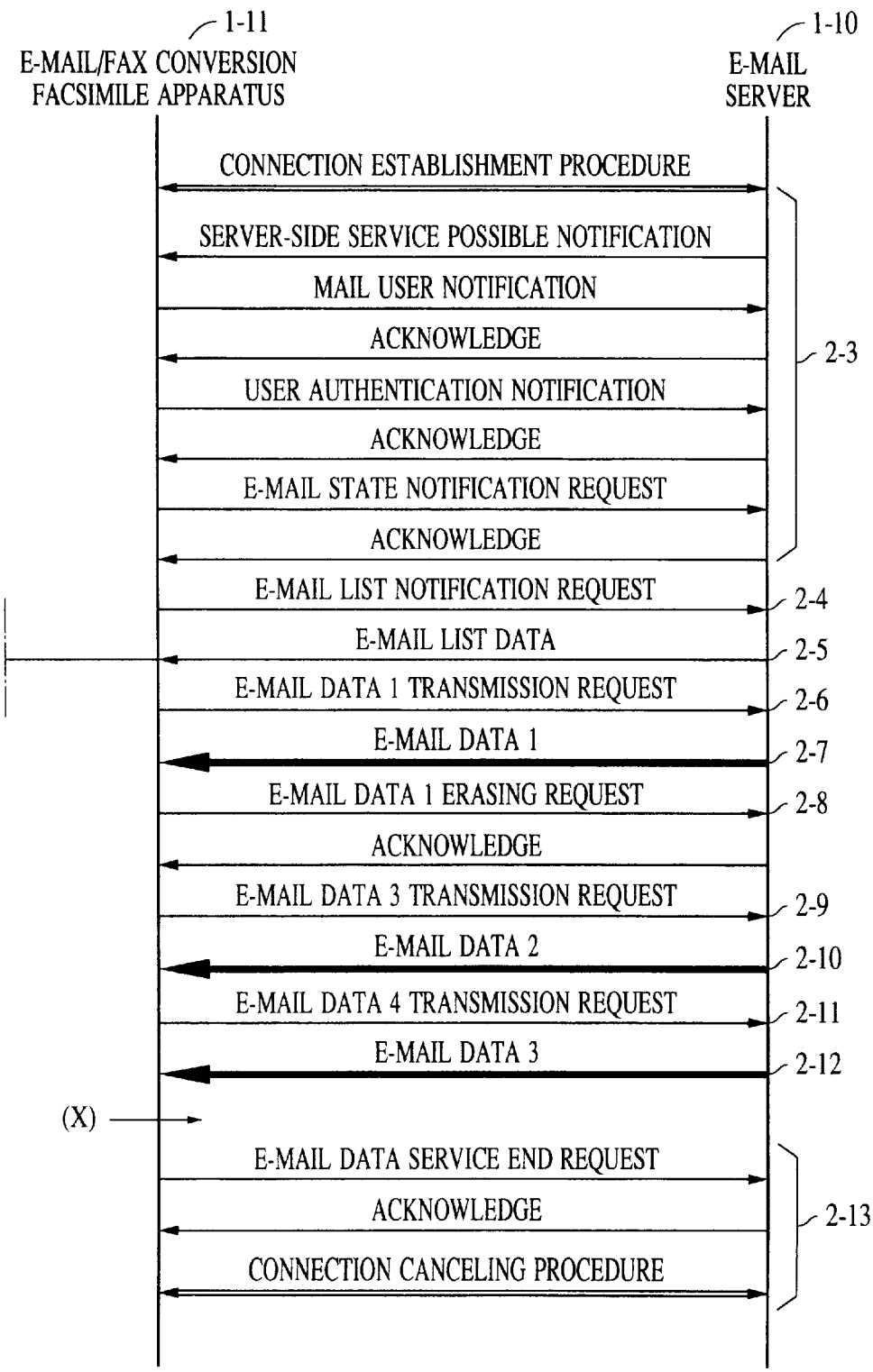

FIG. 4

From : aaa @ bbb. ccc. dd. eee
To : fff @ ggg. hhh. ii. jj
Subject : Fax expansion functions
Mime-Version : 1.0
Content-type : Multipart/Mixed ;
boundary = " - - - Boundary " - - -
Date : Thu, 4 Jul 1996 21 : 00 : 00 + 0999
Message-Id : <19960704215959. TAA99999 @ xxx. ccc. dd. ee>

- - - Boundry - - -
Content-type : Text/Plain ; charset = iso-2022-jp

FACSIMILE DATA FROM aaa @ bbb. ccc. dd. ee to fff @ ggg. hhh. ii. jj

- - - Boundry - - -
Countent-type : messate/external-body ; access-type = ANON-FTP ;
site = " aaa. bbb. cc. dd " ; directory = " fax "
name = file19960704215959. xxx "
content-type : image/iff
content-ID : <19960704215959. TAA99999FILE @ xxx. ccc. dd. ee>
Content-Transfer-Encoding : binary

THIS IS PHANTOM BODY

- - - Boundry - - -

FIG. 5

FROM : aaa @ bbb. ccc. dd. ee
TO : fff @ ggg. hhh. ii. jj
SUBJECT : Fax expansion functions
DATE : JULY 4th (Thu), 1996, 21:00

FACSIMILE DATA FROM aaa @ bbb. ccc. dd. ee to fff @ ggg. hhh. ii. jj

[ONE FACSIMILE IMAGE IS ADDED TO NEXT PAGE]

[END]

FIG. 7

* * * RECEIVED MAIL * * *

FROM : aaa @ bbb. ccc. dd. ee
TO : fff @ ggg. hhh. ii. jj
SUBJECT : Fax expansion functions
DATE : JULY 4th (Thu), 1996, 21:00

FACSIMILE DATA FROM aaa @ bbb. ccc. dd. ee to
fff @ ggg. hhh. ii. jj

FACSIMILE DATA FROM aaa @ bbb. ccc. dd. ee to fff @ ggg. hhh. ii. jj

[COLOR IMAGE OF THE FOLLOWING CONTENTS CANNOT BE PROCESSED BY THIS APPARATUS]
[RETRIEVE THE COLOR IMAGE WITH PERSONAL COMPUTER OR THE LIKE]

Content-type : messate/external-body ;
access-type = local-file ;
name = " /fax/aaa/tiff19960704215959. xxx "
content-type : image/xxx
content-ID < 19960704215959. TAA99999TIFF @ xxx. ccc. dd. ee >
Content-Transfer-Encoding : binary

[END]

FIG. 8

* * * MAIL LIST * * *

TOTAL OF THREE MAILS HAVE BEEN RECEIVED.

MAIL RETRIEVE NUMBER : 1
FROM : aaa @ bbb. ccc. dd. ee
TO : fff @ ggg. hhh. ii. jj
SUBJECT : Subject1
DATE : JULY 4th (Thu), 1996, 9:00
RECEPTION RESULT : MAIL HAS BEEN RECEIVED.

MAIL RETRIEVE NUMBER : 2
FROM : kkk @ lll. ccc. dd. ee
TO : fff @ ggg. hhh. ii. jj
SUBJECT : Fax expansion functions
DATE : JULY 4th (Thu), 1996, 10:00
RECEPTION RESULT : DATA WHICH CANNOT BE INTERPRETED
                     HAS BEEN RECEIVED.

MAIL RETRIEVE NUMBER : 3
FROM : mmm @ lll. ccc. dd. ee
TO : fff @ ggg. hhh. ii. jj
SUBJECT : Fax expansion functions
DATE : JULY 4th (Thu), 1996, 10:00
RECEPTION RESULT : MAIL CANNOT BE RECEIVED DUE TO FULL
                     MEMORY.

[END]

FUNCTION MODE :
 0001h : RECEIVED MAIL PRINT
 0002h : RECEIVED MAIL FAX TRANSMISSION
 0004h : RECEIVED MAIL LIST PRINT
 0008h : MAIL LIST FAX TRANSMISSION

EMAIL SYSTEM CONVERTS EMAIL DATA TO A DIFFERENT FORMAT ACCORDING TO PROCESSING MODE INFORMATION SET IN MEMORY IN CORRESPONDENCE WITH POST OFFICE INFORMATION

BACKGROUND OF THE INVENTION

1. Field of the Invention

The present invention relates to a communication apparatus capable of receiving electronic mail data.

2. Description of the Related Art

In recent years, in addition to speech communication performed by facsimile communication or telephone communication through a telephone line, processing such as electronic mail (hereinafter "e-mail") processing or information searching through the Internet is generally used. With respect to e-mail, not only character information but also image data, audio data, or computer data having various forms can be exchanged. In addition, it can be determined by software registered in a personal computer (hereinafter a "PC") whether a communication destination is a facsimile apparatus or a PC which can transmit/receive e-mail. If the communication destination is a facsimile apparatus, the facsimile apparatus converts character-code data into facsimile image data to perform facsimile communication. If the communication destination is a PC, an e-mail system which can transmit character-code data in the form of e-mail has also been developed. Furthermore, an apparatus which can receive an e-mail and can convert the data of the received e-mail into facsimile image data to perform facsimile communication has also been developed. As these apparatuses, apparatuses which are shared by a plurality of users and transmit received e-mail to destination addresses set in the apparatuses are generally used.

However, the above system or apparatus is mainly for personal use. In the system or apparatus, a document formed by a PC is designated to be transmitted by a person, and basically one-to-one communication is performed.

Therefore, when information transmission is performed through a plurality of PCs, the information transmission must be manually performed. For this reason, rapid information transmission cannot be easily performed. For example, the system will be described below with reference to a certain company. In order to reduce communication cost, the following system is supposed. That is, person A who works at the head office transmits information as e-mail from a PC in the head office (Tokyo) to a PC of person B in the Fukuoka branch, and person B causes the information to be converted into facsimile image data and sent from the PC in the Fukuoka branch through a telephone line to distribute the facsimile image data to facsimiles A and B in a plurality of branch offices (in Fukuoka city).

In this case, in a conventional e-mail system also capable of performing facsimile communication, after an e-mail received from the head office is checked by a person on the branch side, the person must designate the address of a branch office to perform multi-address transmission. More specifically, information transmission between base points must be manually performed.

For this reason, to perform rapid communication, for person A to directly perform facsimile multi-address transmission from a PC of the head office to the facsimile apparatuses A and B of the branch offices in Fukuoka city without bothering person B, a long-distance call fee must be paid each time facsimile transmission is performed to each branch office.

Although a conventional apparatus which receives e-mail and converts the e-mail into facsimile image data to perform facsimile transmission is shared by a plurality of users, the apparatus cannot process the images received by respective users with functions which are set in the apparatus in advance. More specifically, although the apparatus is shared by a plurality of users, the apparatus is not very convenient for a writing user. For example, the apparatus cannot be used in such a manner that e-mail addressed to person A and received by person A is transmitted to a facsimile apparatus installed at another location, or that person B automatically gets a printout of e-mail addressed to person B.

SUMMARY OF THE INVENTION

The present invention has been made in consideration of the above problems, and has as its object to improve a communication apparatus.

It is another object of the present invention to make it possible to automatically and rapidly process e-mail data without the intervention of an operator.

It is still another object of the present invention to make it possible to select a processing mode to be set for each user when one communication apparatus is shared by a plurality of users.

It is still another object of the present invention to make it possible for an operator of a transmission source of e-mail data to recognize a processing state in a destination system of the transmitted e-mail data.

In accordance with the present invention, in order to achieve the above objects, a communication apparatus having the function of retrieving e-mail data from an e-mail server of a local area network or the Internet comprises setting means for setting a processing mode of the retrieved e-mail data and processing means for automatically processing the e-mail data retrieved by retrieving means in a processing mode set by the setting means, so that retrieved e-mail data can be automatically processed without an operation performed by an operator.

Other objects of the present invention will be apparent from the following detailed description of an embodiment and the accompanying drawings.

BRIEF DESCRIPTION OF THE DRAWINGS

FIG. 4 is a view showing an output of e-mail data.

FIG. 5 is a view showing an output of e-mail data.

FIG. 7 is a view showing an output of e-mail data.

FIG. 8 is a view showing an output of an e-mail list.

DESCRIPTION OF THE PREFERRED EMBODIMENTS

Embodiments of the present invention will be described below with reference to the accompanying drawings.

Figure 1:
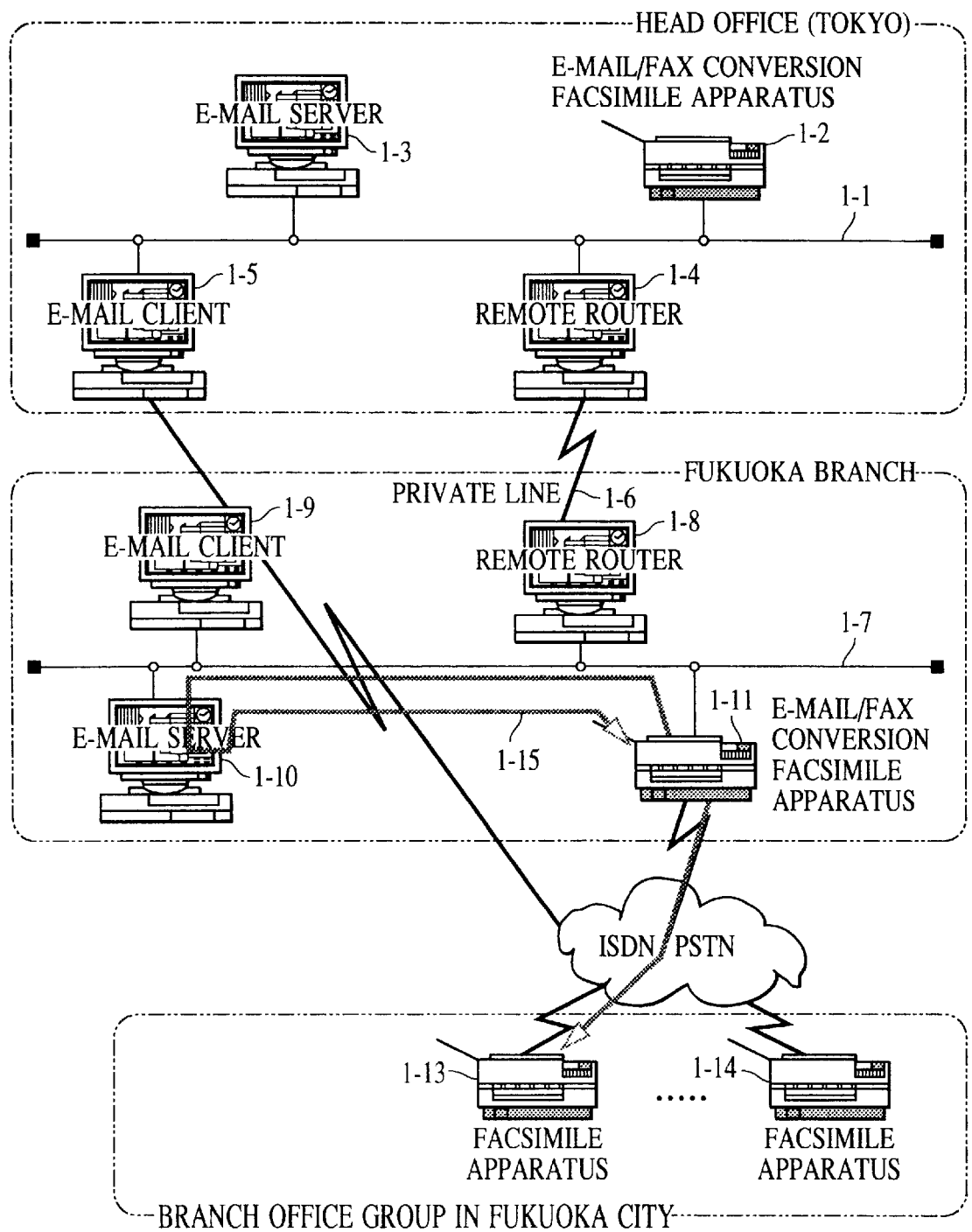
FIG. 1 is a view showing an e-mail facsimile apparatus connected to a network.

FIG. 1 is a view showing a facsimile apparatus (to be referred to as an e-mail facsimile apparatus) having an e-mail/facsimile conversion function connected to a network.

Referring to FIG. 1, an e-mail facsimile apparatus 1-2 according to this embodiment, an e-mail server 1-3, a PC 1-5 of an e-mail client, and a remote router 1-4 for performing inter-LAN connection to the Fukuoka branch through a private line 1-6 are connected to a local area network (to be referred to as a LAN hereinafter) 1-1 of the first head office (Tokyo).

On the other hand, a remote router 1-8 for performing inter-LAN connection to the head office, an e-mail facsimile apparatus 1-11 according to this embodiment, an e-mail server 1-10, and a PC 1-9 of an e-mail client are connected to a LAN 1-7 of the Fukuoka branch. In addition, the e-mail facsimile apparatus 1-11 is connected to the public switched telephone network (PSTN) or the integrated service digital network (ISDN) 1-12, so that the e-mail facsimile apparatus 1-11 can perform facsimile communication with facsimile apparatuses 1-13 and 1-14 of branch offices in Fukuoka city.

Figure 10:
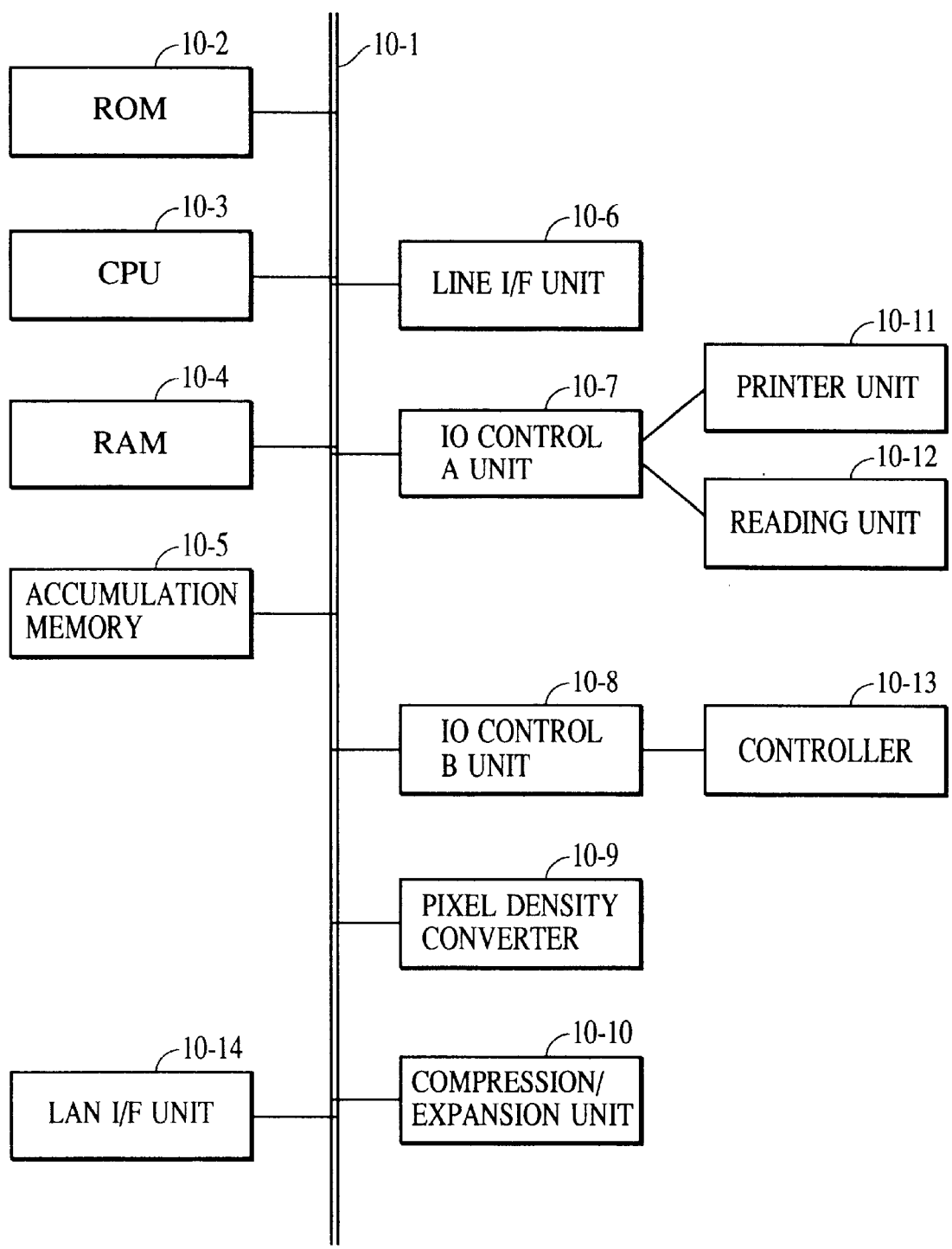
FIG. 10 is a block diagram showing the arrangement of an e-mail facsimile apparatus.

FIG. 10 is a block diagram showing the arrangement of e-mail facsimile apparatuses 1-2 and 1-11 according to this embodiment.

Referring to FIG. 10, a ROM 10-2 is a read-only memory in which a computer program (software for controlling the apparatus as a whole) executed by a CPU 10-3 is stored, and the CPU 10-3 executes the program stored in the ROM 10-2 to control the apparatus.

Figure 3:
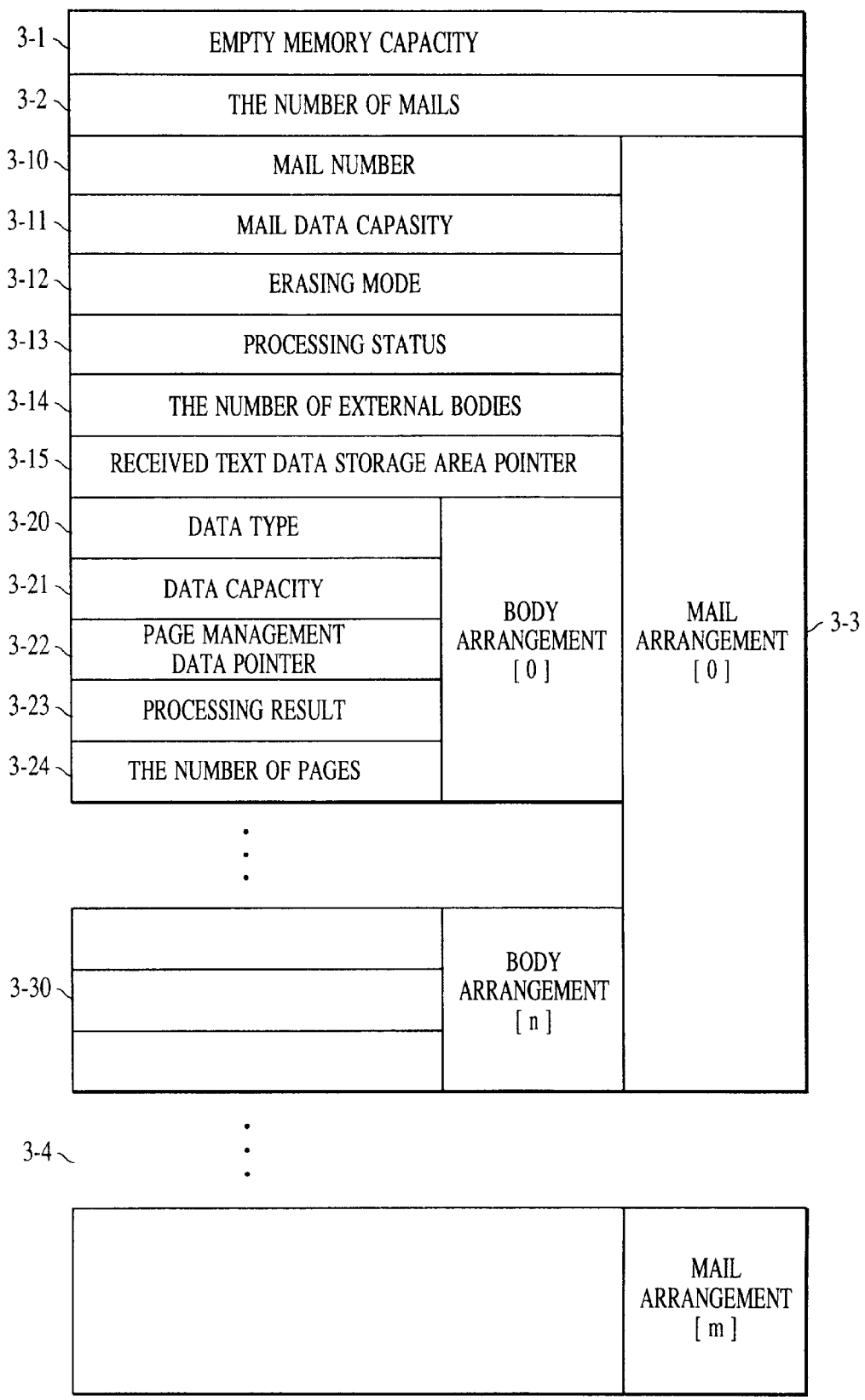
FIG. 3 is a view showing management data of e-mail data.

A RAM 10-4 is a random-access memory for storing various data required for control or management data shown in FIG. 3, and an accumulation memory 10-5 is a memory for storing data coded for facsimile communication or e-mail data.

A line I/F unit 10-6 has a CCU (communication control unit) for performing communication through the ISDN line or the PSTN line, a modem, an NCU (network control unit), and the like, to perform a calling operation and a communication operation to the line under the control of the CPU 10-3.

An IO controller 10-7 controls a recording operation by a printer unit 10-11, a reading operation by a reading unit 10-12, and a transfer operation of image data under the control of the CPU 10-3.

An IO controller 10-8 controls a controller 10-13 having a display unit or various keys under the control of the CPU 10-3 to transfer key input information input by the controller 10-13 and various information displayed on the display unit.

A pixel density converter 10-9 performs resolution conversion for image data, conversion for a page size, millimeter/inch conversion, and the like.

A compression/extension unit 10-10 codes image data read by the reading unit 10-12 (MH, MR, MMR, or the like) or decodes received coded data.

A LAN I/F unit 10-14 is an interface for performing connection to the LAN.

When the text of e-mail data is converted into image data, bit map data for converting a character code into bit map image data is stored in the ROM 10-2.

Figure 11:
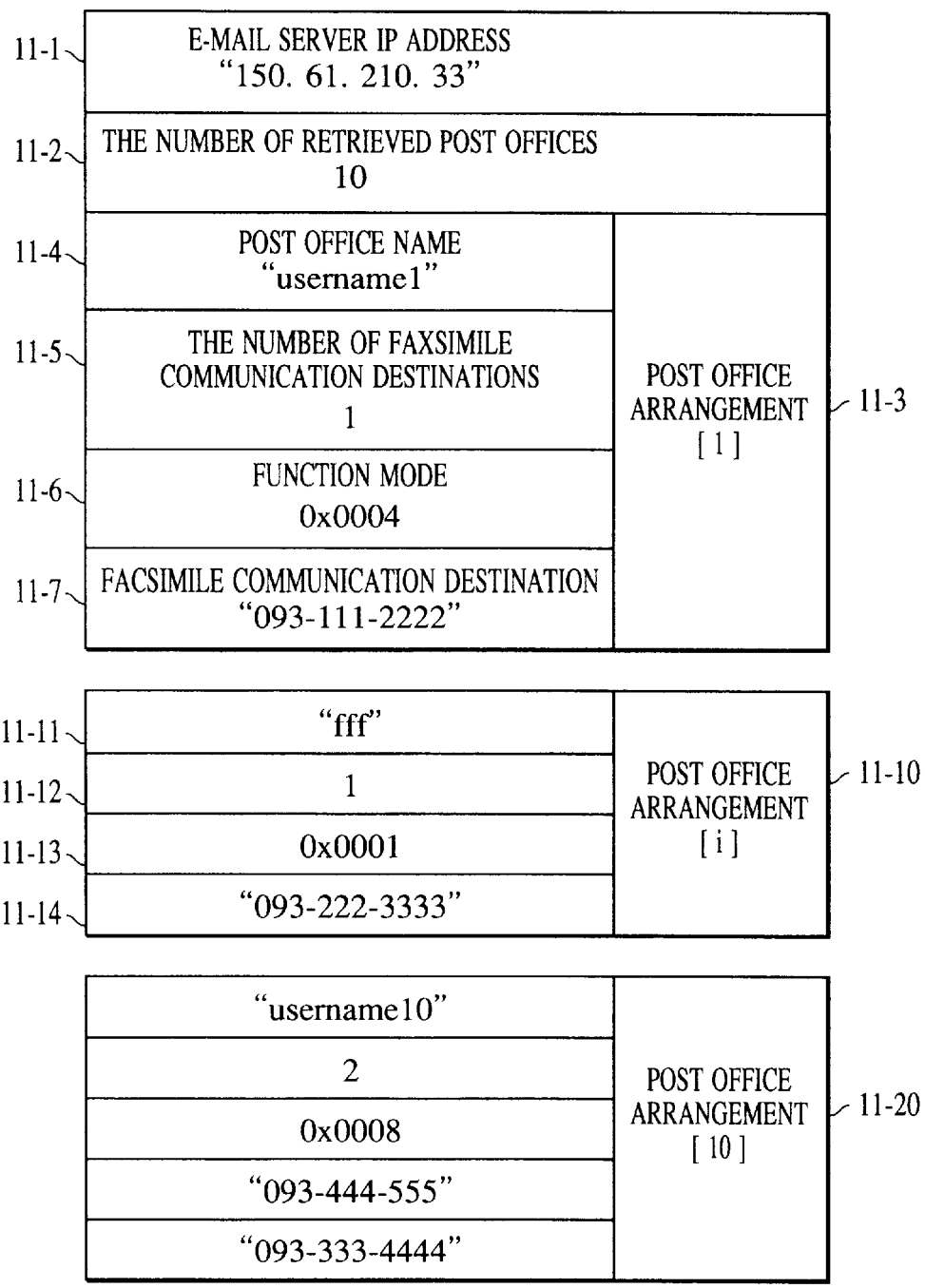
FIG. 11 is a view showing a data structure of a data area for storing registration data related to an e-mail server.

FIG. 11 is a view showing a data structure of a data area for storing registration data related to an e-mail server from which e-mail data is retrieved by the e-mail facsimile apparatus of this embodiment. The registration data is stored in the RAM 10-4 in FIG. 10.

Figure 2A:
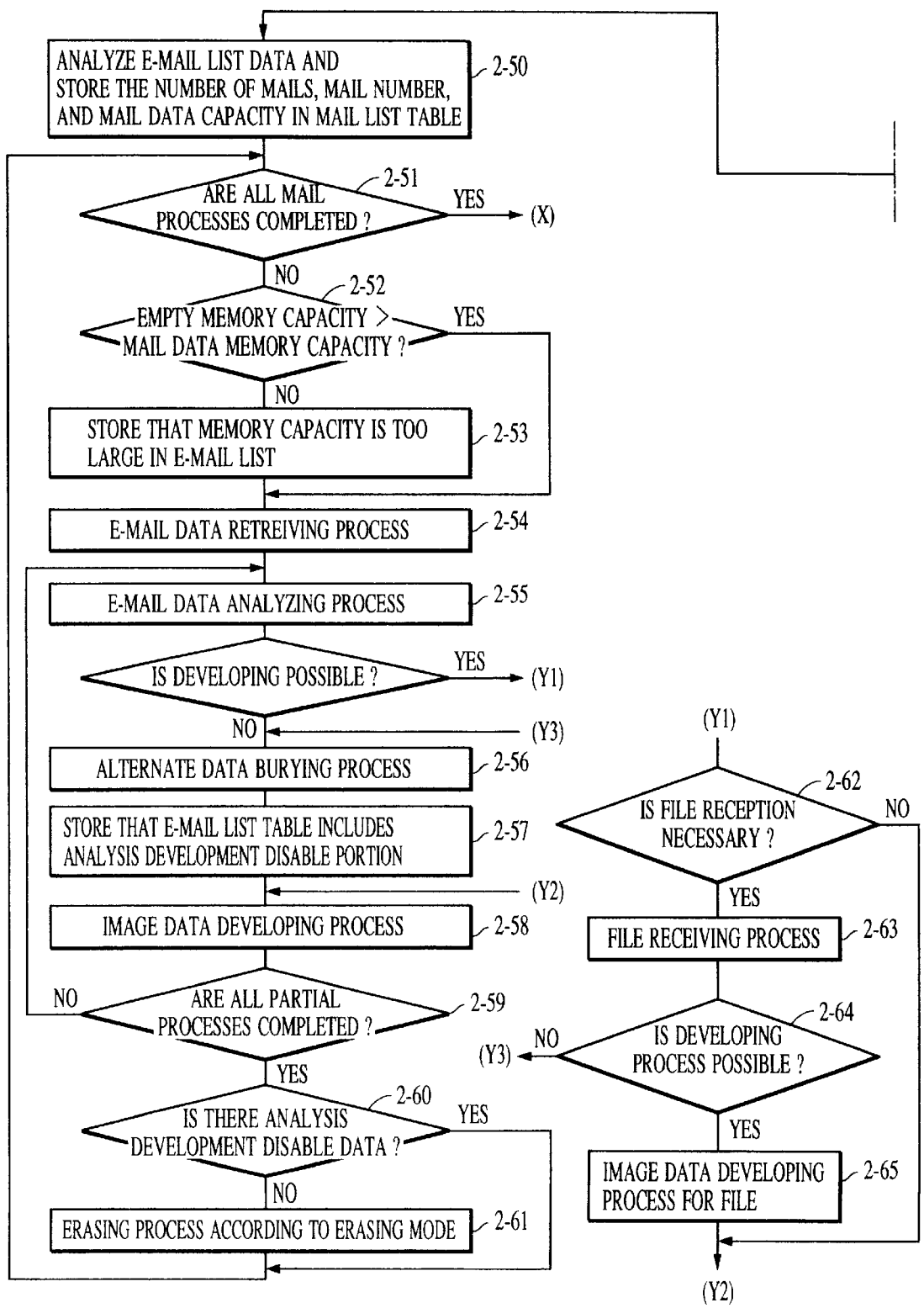
FIG. 2, consisting of FIGS. 2A and 2B, is a view showing a communication sequence and communication processes performed by an e-mail facsimile apparatus according to an embodiment of the present invention.

Referring to FIG. 11, "150.61.210.33" at an e-mail server IP address 11-1 is an address for designating, e.g., the e-mail server 1-10. In this embodiment, the e-mail facsimile apparatus 1-11 considers that the number of post offices serving as targets when e-mail data is retrieved from the e-mail server 1-10 is 10, and the number of post offices is stored in the number of retrieved post offices 11-2. In this manner, the e-mail facsimile apparatus 1-11 performs a polling process to each of 10 post offices selected from the e-mail server 1-10 to periodically execute enquiry of the presence/absence of e-mail data and a retrieving process of e-mail data. The communication procedure sequence of the polling process is shown in FIGS. 2A and 2B. For the communication procedure sequence of the polling process, POP3 ("Post Office Protocol Ver. 3" recommended by "IETF (Internet Engineering Task Force)") is used.

With respect to the 10 post offices, post office information 11-3 . . . 11-10 . . . 11-20 is set. As the contents of the post office information, various data such as a post office name 11-4 for specifying a post office, the number of facsimile communication destinations 11-5 for converting e-mail retrieved from a post office into image data to perform facsimile transmission, a received mail print for printing received e-mail, received mail FAX transmission for facsimile-transmitting received e-mail, a received mail list print for printing a list of received e-mail, a function mode 11-6 for storing information representing function modes of received mail list FAX transmission for transmitting a list of received e-mail as facsimile data, and facsimile communication destination 11-7 representing destination data for facsimile communication are stored.

The destination data for facsimile communication may be acquired from the information of FAX telephone numbers described in e-mail data retrieved from the e-mail server. When destination data subjected to facsimile communication is described in e-mail data retrieved from the e-mail server, the destination data is preferentially used over the facsimile communication destination 11-7, and a FAX telephone number described in the e-mail data is used as a facsimile communication destination.

Figure 12:
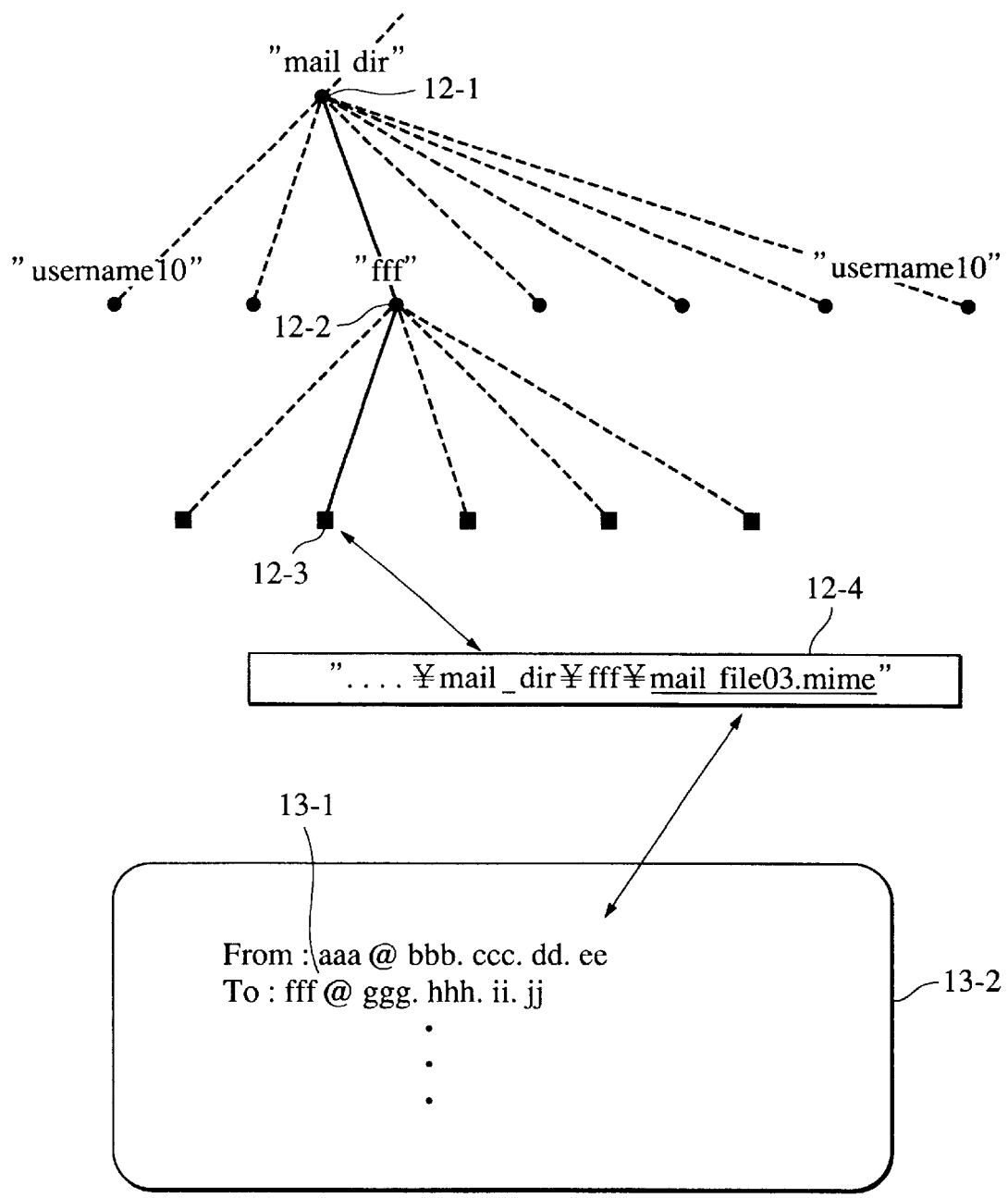
FIG. 12 is a view showing a directory arrangement in an auxiliary storage device of an e-mail server 1-10.

FIG. 12 shows a directory arrangement in an auxiliary storage device of the e-mail server 1-10. A post office in the server is formed as a sub-directory under a "mail-dir" directory 12-1. A directory "fff" 12-2 (11-10 in FIG. 10) is a post office for performing facsimile communication to the facsimile apparatus 1-13 of the Fukuoka branch through e-mail. The post office corresponds to post office information 11-10 in a one-to-one relationship. When the facsimile apparatus 1-11 retrieves e-mail data from the post office "fff", the e-mail facsimile apparatus 1-11 refers to the post office name "fff" (11-11 in FIG. 11) of the post office information 11-10 and sets the post office name "fff" as a parameter of a mail user notification command 2-3 (see FIG.

2) of the POP3 procedure to transmit the post office name "fff" to the e-mail server.

Reference numeral 13-2 denotes a part of the contents of an e-mail file "mail_file003.mime" which is mailed to the directory "fff" of the e-mail server 1-10 in such a manner that the PC 1-5 sets an e-mail address "fff@ggg.hhh.ii.jj" (13-1) as a destination address to transmit e-mail. This file is a text file described in a MIME ("Multipurpose Internet Mail Extensions" serving as an e-mail data format recommended by the IETF). The transmission destination e-mail server 1-10 is specified by "ggg.hhh.ii.jj" of the "fff@ggg.hhh.ii.jj" (13-1), and a post office is specified by the user name "fff".

Transmission from the PC 1-5 to a Fukuoka branch office will be described below.

When e-mail data addressed to the Fukuoka branch office and formed by the PC 1-5 in FIG. 1 is transmitted to the e-mail server 1-10, the e-mail data is transmitted to the post office "fff" (12-2) for repeating at the Fukuoka branch set in the storage device of the e-mail server 1-10 in the Fukuoka branch in an e-mail transmission procedure SMTP (Simple Mail Transfer Protocol, recommended by the IETF) through the remote router 1-4, the private line 1-6, and the remote router 1-8. Thereafter, the e-mail facsimile apparatus 1-11 retrieves e-mail data from the post office of the e-mail server 1-10 as indicated by an arrow 1-15. When the function mode of the post office arrangement [i] of the e-mail data is set in the received mail FAX transmission, the e-mail facsimile apparatus 1-11 converts the retrieved e-mail data into facsimile image data and automatically dials a facsimile communication destination "093-222-3333" (1-13) as indicated by an arrow 1-16 to transmit the e-mail data to the facsimile apparatus 1-13 in the Fukuoka branch office. When there are a plurality of facsimile communication destinations as in post office information 11-20 (the number of facsimile communication destinations is 2), the e-mail facsimile apparatus 1-11 performs multi-address transmission to a plurality of facsimile apparatuses "093-333-4444" and "093-444-5555". The communication procedure of facsimile transmission is the T.30 procedure recommended by the ITU-T.

Figure 15:
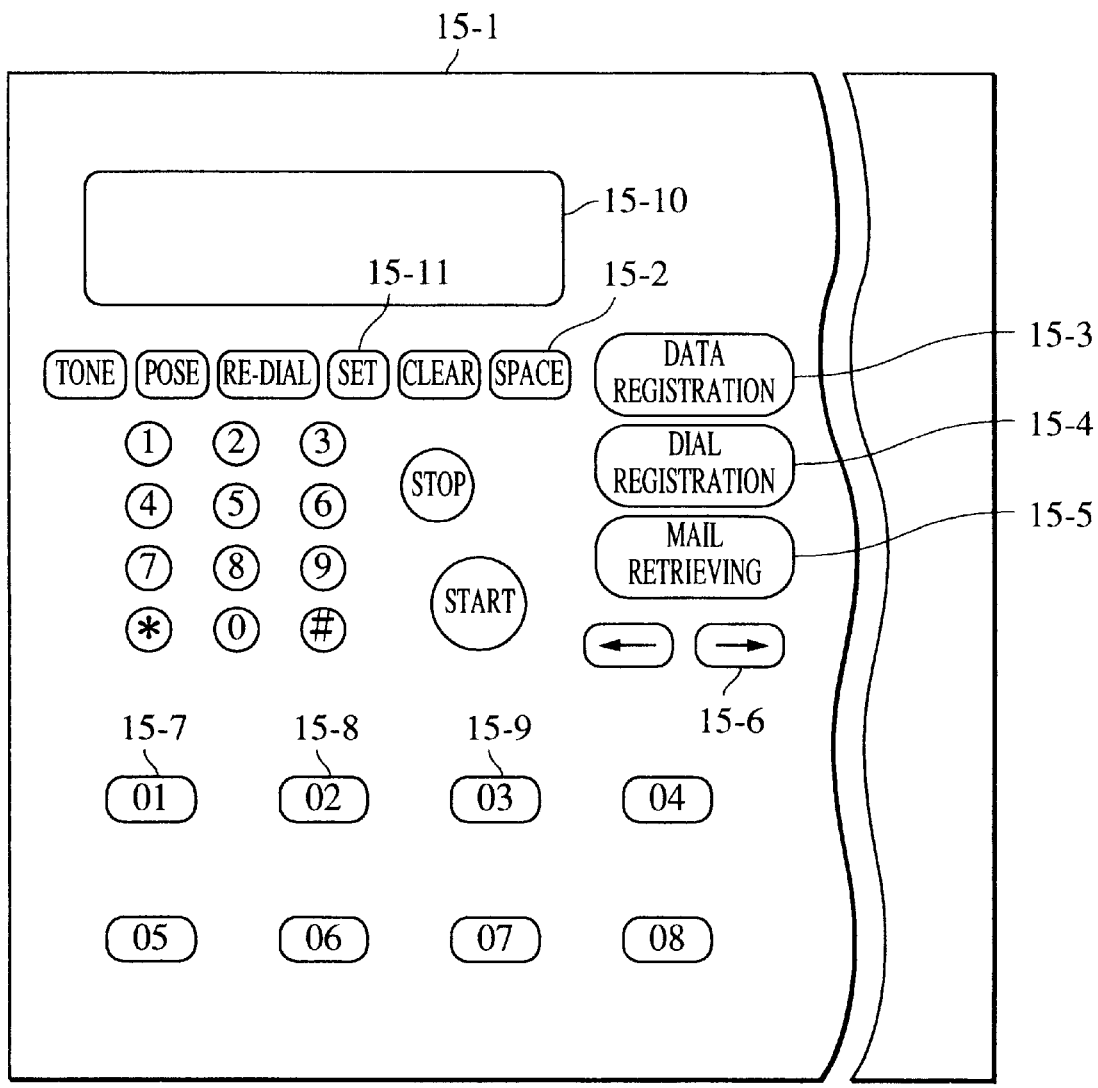
FIG. 15 is a view showing an operation panel 15-1 of a controller 10-13 of the e-mail facsimile apparatus.

FIG. 15 is a view showing an operation panel 15-1 of the controller 10-13 of the e-mail facsimile apparatus.

Reference numeral 15-2 denotes a space key; 15-3, a data registration key for performing data registration; 15-4, a dial registration key; 15-5, a mail retrieving key for retrieving an e-mail from the e-mail server 1-10 by a manual operation; 15-6, a right arrow key for selecting an item in data registration; 15-7, 15-8, and 15-9, one-touch dials 01, 02, and 03 keys; 15-10, a display unit for displaying a registration screen or the like; and 15-11, a set key used for fixing the setting of a registration operation or the like. A program for registering registration data shown in FIG. 11 in the RAM 10-4 by using the operation panel 15-1 is stored in the ROM 10-2 and executed by the CPU 10-3.

Figure 16A:
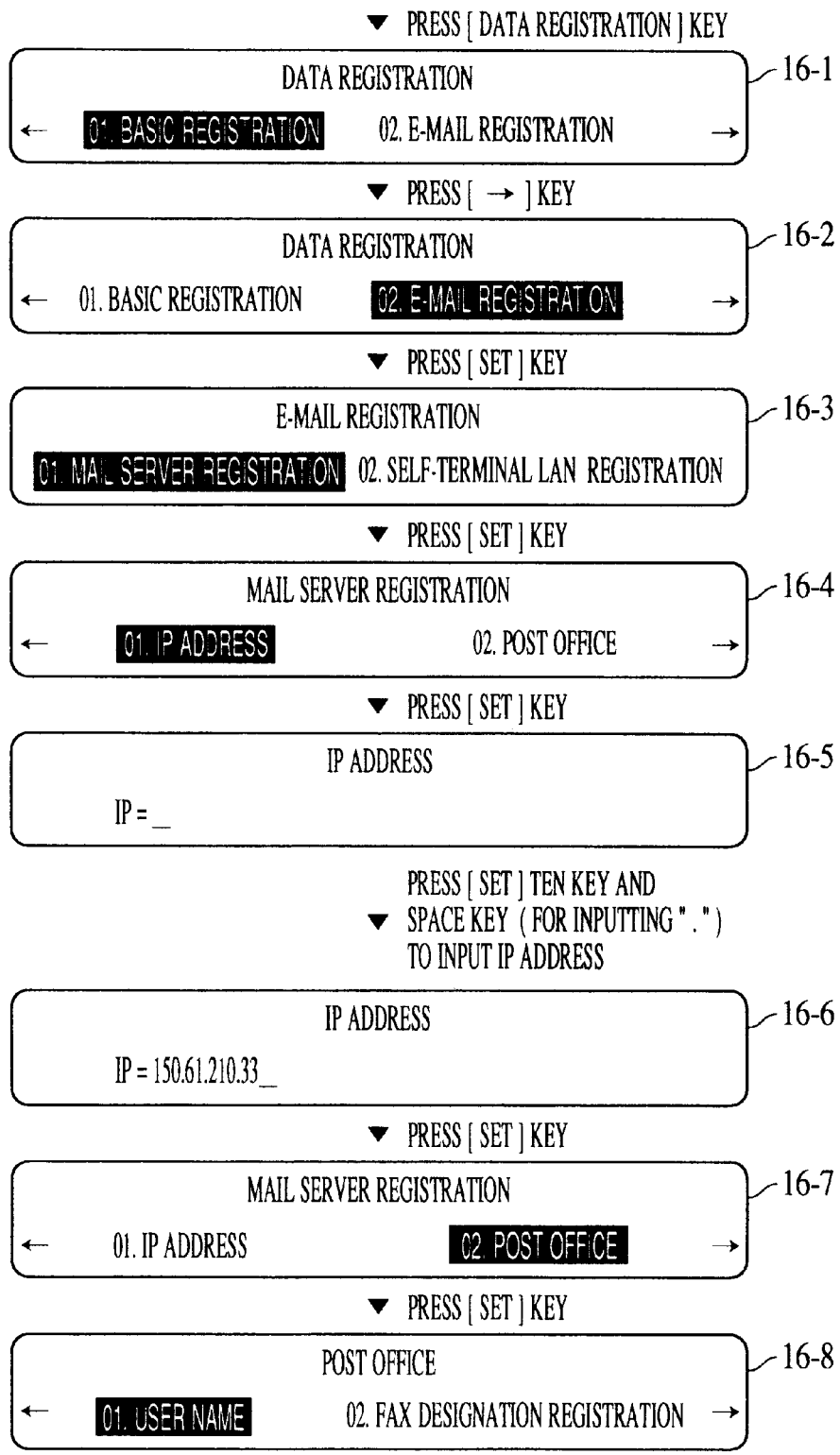
FIGS. 16A and 16B constitute is a transition view of an operation of registering registration data.
Figure 16B:
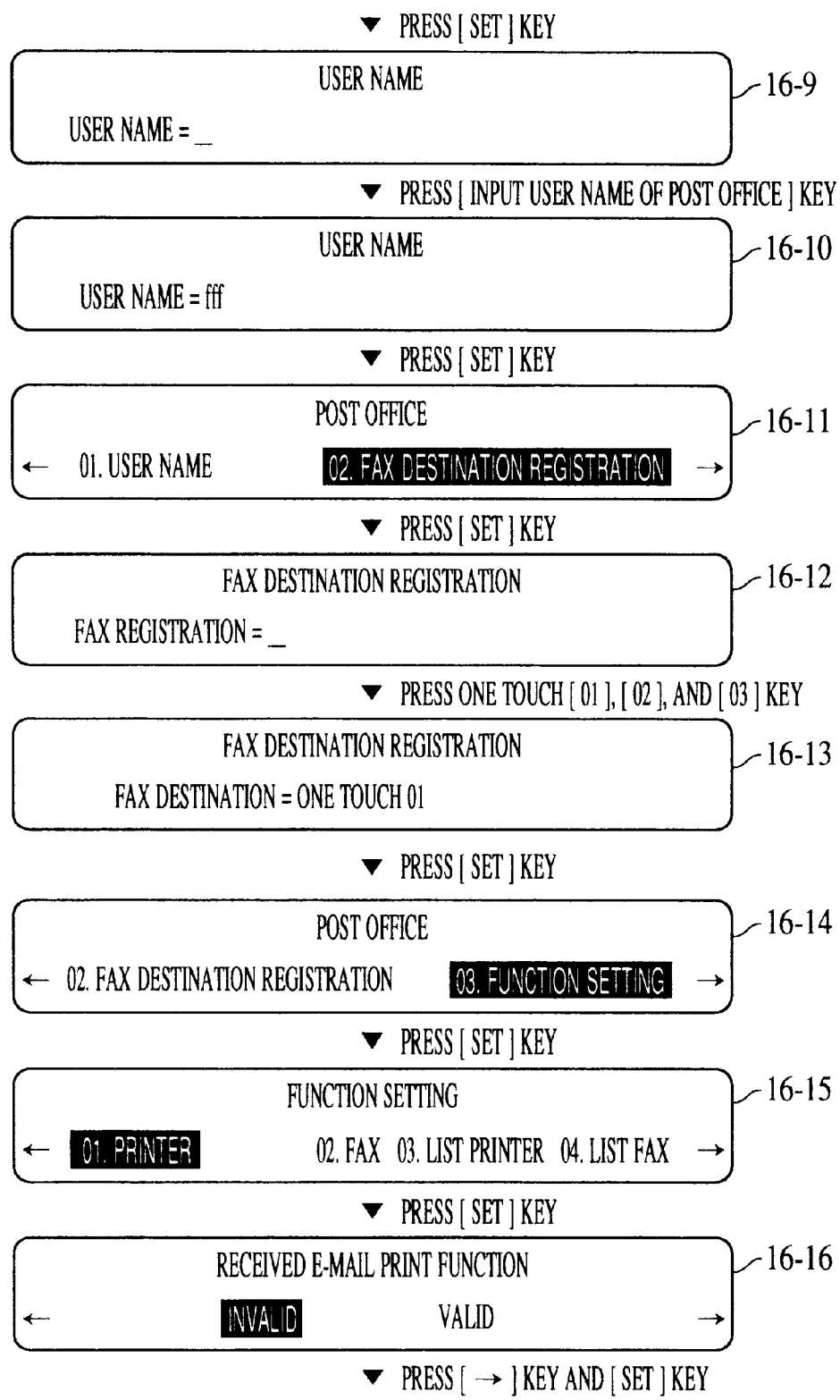

On the basis of the screen transition view of the display unit 15-10 showing an operation of registering registration data in FIGS. 16A and 16B, registration of access information related to an e-mail server accessed by the e-mail facsimile apparatus, a function corresponding to the post office of the e-mail server, and a FAX destination corresponding to the post office will be described below.

To perform registration, an operator presses the registration key 15-3. When the CPU 10-3 detects an input of the registration key 15-3, the CPU 10-3 causes the display unit 15-10 to display a data registration screen 16-1. When the operator checks the data registration screen 16-1 to press the right arrow key 15-6 for selecting an e-mail registration item, the CPU 10-3 detects an input of the right arrow key 15-6 to cause the display unit 15-10 to display a screen 16-2 according to the detection. When the operator presses the set key 15-11, the CPU 10-3 detects an input of the set key 15-11 to cause the display unit 15-10 to display an e-mail registration screen 16-3 according to the detection.

In the e-mail registration screen 16-3, a mail server registration item is an initial selection target item. When the operator presses the set key 15-11 to register the IP address of an e-mail server, the CPU 10-3 causes the display unit 15-10 to display a mail server registration screen 16-4 according to detection of the input of the set key 15-11.

In the mail server registration screen 16-4, an IP address item is an initial selection target item. When the operator presses the set key 15-11, the CPU 10-3 causes the display unit 15-10 to display an IP address input screen 16-5 according to detection of the input of the set key 15-11. Since the IP address of the e-mail server according to this embodiment is "150.61.210.33", the operator inputs the IP address by using the ten key and the space key 15-2, and the CPU 10-3 sequentially causes the display unit 15-10 to display an IP address input by the operator (screens 16-5 and 16-6). In this manner, upon completion of an input of an IP address, the operator presses the set key 15-11 to fix the input IP address, and the CPU 10-3 stores the input IP address in the e-mail server IP address 11-1 in FIG. 11 according to detection of the input of the set key 15-11 to cause the display unit 15-10 to display a mail server registration screen 16-7.

In the mail server registration screen 16-7, a post office item is a selection target. When the operator presses the set key 15-11 to register a post office item, the CPU 10-3 causes the display unit 15-10 to display a post office registration screen 16-8 according to detection of the input of the set key 15-11.

In the post office registration screen 16-8, a user name is an initial selection target item. When the operator presses the set key 15-11 to register a user name, the CPU 10-3 causes the display unit 15-10 to display a user name registration screen 16-9 according to input detection of the set key 15-11. In this operation screen, it is assumed that registration corresponding to the ith post office is performed. The operator inputs the user name "fff" of the post office with the ten keys, and the CPU 10-3 causes the display unit 15-10 to display the user name of the post office according to the input of the user name "fff" (screen 16-10). When the operator presses the set key 15-11 to fix the input user name of the post office, the CPU 10-3 stores i in the number of retrieved post offices 11-2 in FIG. 11 according to the input detection of the set key 15-11 and stores the input user name in the post office name 11-11 of the post office arrangement [i] 11-10 to cause the display unit 15-10 to display a post office registration screen 16-11. In the post office registration screen 16-11, FAX destination registration is an initial selection target item. When the operator presses the set key 15-11 to register a FAX destination, the CPU 10-3 causes the display unit 15-10 to display a FAX destination registration screen 16-12 according to the input detection of the set key 15-11. The FAX numbers of the respective branch offices in Fukuoka city are registered in the one-touch dial keys 01, 02, and 03 in advance, so that the operator can input a one-touch dial key as a FAX destination. When the operator presses the one-touch dial key 01 (15-7), according to the input detection of the one-touch dial key, the CPU 10-3 causes the display unit 15-10 to display a screen 16-13 representing that the one-touch dial key 01 (15-7) is designated as a FAX destination address.

When the operator presses the set key 15-11 to fix an input FAX destination, the CPU 10-3 stores destination data "093-222-3333" of the one-touch dial key 01 in a facsimile communication destination 11-14 in FIG. 11 according to the input detection of the set key 15-11, increments the value of the number of facsimile communication destinations (initial value: 0) 11-12, and causes the display unit 15-10 to display the post office screen 16-14. In the post office screen 16-14, a function setting item is a selection target item. When a FAX destination is added, a FAX destination registration is selected by a left arrow key. When the function setting registration is selected, the operator presses the set key 15-11.

When the operator selects function setting registration and presses the set key 15-11, the CPU 10-3 causes the display unit 15-10 to display a function setting screen 16-15 according to the input detection of the set key 15-11. When the operator selects a desired function item with the left/right arrow key 15-6, the CPU 10-3 recognizably displays the selected item. When the operator presses the set key 15-11 to fix the selected function item, according to the input detection of the set key 15-11, the CPU 10-3 causes the display unit 15-10 to display a selection screen (for example, a screen 16-16 is used when a print function is selected) for determining whether the selected function is valid or invalid. When the operator selects that the selected function is valid with the left/right arrow key 15-6 and selects validity with the set key 15-11, the CPU 10-3 stores, according to the input detection of the set key 15-11, the data of the selected function item (received mail print: 0001h, received mail FAX transmission: 0002h, received mail list print: 0004h, and received mail list FAX transmission: 0008h) in a function mode 11-13 in FIG. 11.

For example, when the function of printing a received e-mail is selected with the above processes, data of 0001h is stored. When the e-mail is retrieved from the e-mail server with this registration process, the CPU 10-3 automatically executes steps 9-10 and 9-11 in FIG. 9 (to be described later) and performs a recording (printing) process of the retrieved e-mail data.

With the above processes, each user of the e-mail facsimile apparatus selects a desired function mode to set the function mode in the apparatus.

FIG. 2 a view showing a communication procedure sequence for retrieving an e-mail from the e-mail server 1-10 of a LAN by the e-mail facsimile apparatus 1-11 and a flow chart of the communication procedure sequence. A control program for executing the communication procedure sequence and the flow chart is stored in the ROM 10-2 and executed by the CPU 10-3.

An operation of the e-mail facsimile apparatus will be described below with reference to the communication sequence and the flow chart shown in FIG. 2.

In the communication sequence in FIG. 2, a total of three types of e-mail are received, and procedures in the following cases are described. That is, e-mail data is normally received as first e-mail, e-mail data which cannot be interpreted is received as second e-mail data, and the header information of e-mail data is extracted as third e-mail because an amount of e-mail data is too large. This flow chart shows processes from reception 2-5 of the list data of the e-mail data to service end request procedure 2-1 of the e-mail data.

The CPU 10-3 of the e-mail facsimile apparatus 1-11 reads information "150.61.210.33" of the e-mail server IP address 11-1 shown in FIG. 11 from the RAM 10-4 to communicate with the e-mail server 1-10, forms a TCP link by a port number of the POP3 according to the TCP procedure, and executes a connection establishment procedure to the e-mail server 1-10. Subsequently, the CPU 10-3 causes the LAN I/F unit 10-14 to execute a series of procedures (server-side service capability, user authentication, the presence/absence of an e-mail to a user address, and the like) 2-3. As the parameter of the user authentication, a character string "fff" is extracted from the post office name 11-11 of the post office information corresponding to the post office "fff" of the e-mail server 1-10 to designate the character string "fff". Since details related to the connection establishment procedure to the e-mail server 1-10 were described above in connection with FIGS. 1, 11, and 12, the description of the connection establishment procedure is omitted here. In this manner, a communication link between the e-mail facsimile apparatus and the e-mail server is established. The empty memory capacity 3-1 (see the management data shown in FIG. 3) of the accumulation memory 10-5 at this time is assumed as 300 kbyte.

In the communication sequence, thereafter, the CPU 10-3 of the e-mail facsimile apparatus 1-11 causes the e-mail server 1-10 to transmit a notification request of an e-mail list through the LAN I/F unit 10-14 (2-4), and the CPU 10-3 receives e-mail list data from the e-mail server 1-10 (2-5). The CPU 10-3 of the e-mail facsimile apparatus 1-11 analyzes the contents of the received e-mail list data, sets three pieces of information in the number of e-mail 3-2 of the mail list table of the management data in FIG. 3 as the number of e-mails, and sets mail numbers 1, 2, and 3 and mail data capacities, e.g., mail data capacities 1 kbyte (facsimile image data: 30 kbyte), 2 kbyte (color image data: 40 kbyte), and 500 kbyte in corresponding areas of the mail arrangements [0], [1], and [2] (2-50).

The process for the first e-mail (as shown in FIG. 4, the e-mail data includes text data and facsimile data) will be described below. The CPU 10-3 checks the completion of the process for all the mails (2-51). Since the process has not been completed in this case, the empty memory capacity (empty memory capacity 3-1 of the management data in FIG. 3: 300 kbyte is set here) and the data capacity (mail data capacity of the mail arrangement [0] of the management data in FIG. 3; 1 kbyte is set here) are checked (2-52). Since the empty memory capacity is sufficiently large, the CPU 10-3 shifts to the e-mail data retrieving process (2-54). In this e-mail data retrieving process, the CPU 10-3 causes the e-mail server 1-10 to transmit a transmission request for e-mail data 1 (2-6), and retrieves the e-mail data 1 from the e-mail server 1-10 (2-7). In this case, the CPU 10-3 sets 1 in the number of external bodies 3-14 (FIG. 3) of the e-mail list table and acquires a text in data type 3-20 of the body arrangement [0] and a 1-kbyte empty memory in data capacity 3-21. The CPU 10-3 sets the address at a received text data storage area pointer 3-15, and stores the received e-mail data 1 (text) in the acquired memory.

In the received data shown in FIG. 4, a portion from "From: aaa@bbb.ccc.dd.ee" to "Message-Id: <19960704215959.TAA99999@xxx.ccc.dd.ee>" is used as a header portion, and a portion up to the first "—Boundary—" is used as a body portion. The body portion is divided by "—Boundary—" into two portions. The first half serves as a body portion 1, and the second half serves as a body portion 2.

Finally, 2 is set in the number of external bodies 3-14. The data contents of the body portion 1 and the body portion 2 are different from each other. The body portion 1 is Japanese text data represented by "Content-type: Text/Plain;charset=iso-2022-jp". The header portion and the body portion 1 are converted into a text as shown in FIG. 5.

Figure 6:
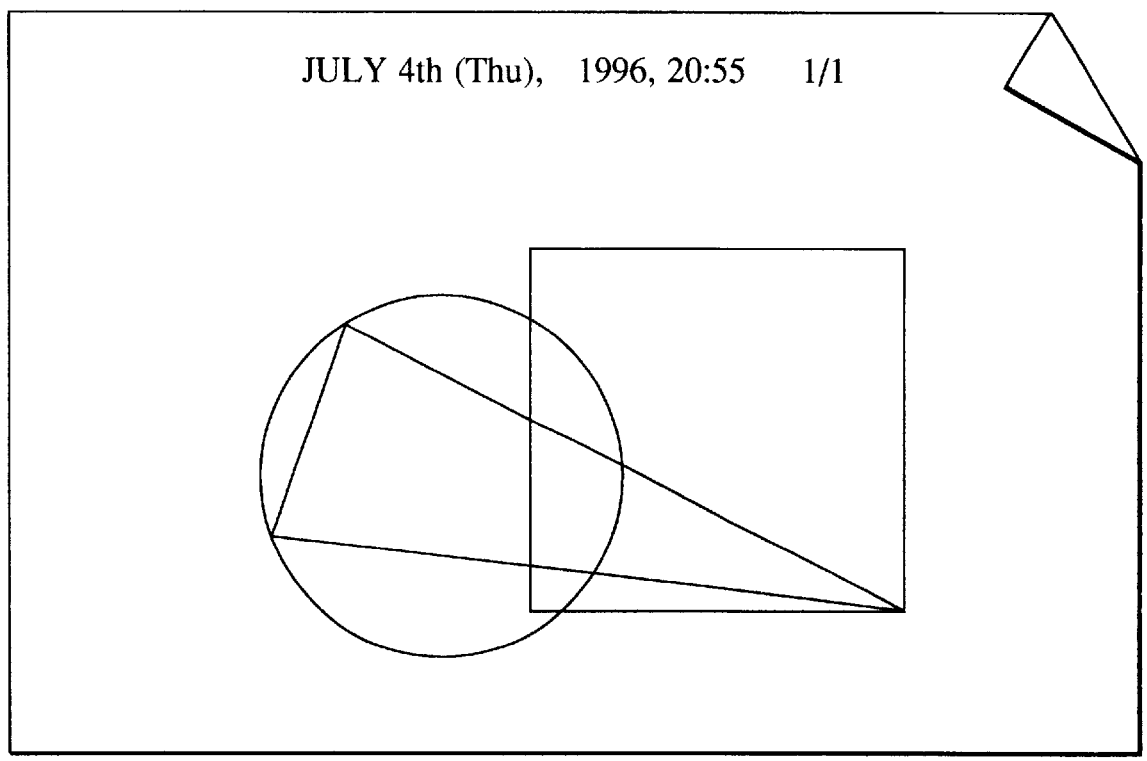
FIG. 6 is a view showing an output of e-mail data.

On the other hand, the body portion 2 is an external file defined by Content-type: message/external-body; access-type=ANON–FTP;

site="aaa.bbb.cc.dd"; directory="fax"
name="file19960704215959.xxx"
content–type: image/iff, and the identifier representing the contents of the body portion 2 is "content-type: image/iff" and indicates that the external file is an image data file. In this image data file, information for expressing an image is set. By the way, facsimile image data having a resolution of "8×3.85 ppm", using "MH (Modified Huffman)" as a coding scheme, having the number of main scanning pixels of "1728 dot", and shown in FIG. 6 is used.

The CPU 10-3 shifts to the e-mail data analyzing process (2-55) to analyze the body portion 1 of the e-mail data 1. Since "Content-type: Text/Plain; charset=iso–2022–jp" is established according to the description of "—Boundary—", the CPU 10-3 determines that the e-mail data is text data. Since the text data can be developed into image data, the CPU 10-3 shifts to step 2-62 to store information "OK" in a processing result 3-23 of the body arrangement [0]. Here, since a file need not be received, the CPU 10-3 shifts to an image data developing process (2-58). In the image data developing process, "Text/Plain; charset=iso–2022 jp" is set in the data type 3-20, one page management data is acquired, and the address of the page management data is set at the page management data pointer 3-22. The text data as shown in FIG. 5 is generated from the text of the header portion in FIG. 4 and the text from the next line of "Content-type: Text/Plain; charset=iso–2022–jp" to the line before "—Boundary—". The text data is converted into facsimile image data of a coding scheme "mh" by the compression/extension unit 10-10 in such a manner that a bit map image having a resolution of "8×3.85" and the number of main scanning pixels of "1728 pel/mm" is generated by indexing a character bit map image in the ROM 10-2. At the same time, while an image data block is acquired, the data is set in the image data block. In addition, the number of main scanning pixels 14-2, the resolution 14-3, and the coding scheme 14-4 in the page management record (FIG. 13) are set to the above values, respectively, and these values are connected to the end of the image data block queue of the image data block pointer 14-6 in FIG. 13. In addition, an image data size 14-5 increments by 8 kbyte, and the image data developing process is ended.

The CPU 10-3 determines whether the partial process of the e-mail data 1 is completed (2-59). Since the partial process is not completed, the CPU 10-3 shifts the e-mail data analyzing process (2-55) to analyze the body portion 2 in FIG. 4. Here, on the basis of the description of "content-type: image/iff", it is determined that the body portion 2 is image data. In addition, on the basis of the description of Content-type: message/external-body; access-type=ANON–FTP;

site="aaa.bbb.cc.dd"; directory="fax"
name="file19960704215959.xxx", the CPU 10-3 determines that data to be retrieved is the external file "message/external-body", a file retrieved by anonymous FTP (file transfer procedure) "access-type= ANON–FTP", and a file name "file19960704215959.xxx" filed in a directory "fax" of an auxiliary storage device of a computer having a host name "aaa" in a domain "bbb.cc.dd". In this manner, it is determined that file reception must be performed (2-62), and the CPU 10-3 executes the receiving process of the corresponding file to store the received file in the RAM 10-4 (2-63).

As described above, the received file is the facsimile image data having a resolution of "8×3.85" and the number of main scanning pixels of "1728 dot", using "MH (Modified Huffman)" as a coding scheme, and shown in FIG. 6. For this reason, the CPU 10-3 determines that the file data can be developed (2-64), and performs the image data developing process for the received file data (2-65). In this case, the CPU 10-3 acquires page management data, sets the data such as a resolution in the acquired page management data, and acquires an image data block from the accumulation memory 10-5. While the CPU 10-3 stores the facsimile image data retrieved from the received file in the acquired image data block, the CPU 10-3 generates the queue of the image data block, sets the queue in the image data block pointer of the body arrangement [1] in FIG. 3, and sets "OK" in the processing result.

Since the data of the e-mail data 1 can be completely developed into facsimile image data, an "erasing request" is set in an erasing mode 3-12 in FIG. 3 through the determinations in steps 2-59 and 2-60 to cause the e-mail server 1-10 to transmit an erasing request 2-8 of the e-mail data 1. The e-mail server 1-10 erases the e-mail data 1 in response to the erasing request of the e-mail data 1.

The process for the second type of e-mail (an external file which cannot be interpreted as a text) will be described below. Since the process sequence of the text data is similar to the above e-mail data 1, a description thereof will be omitted, and a text analyzing process will described first.

Here, when the analyzing process (2-55) for e-mail data is executed, it is apparent that the process for a color image data file must be executed. Since the color image data file cannot be processed, information "Color image process disable" is set in the processing status of the mail arrangement [1] of the management data in FIG. 3, an alternate character string such as "Color image of the following contents cannot be processed by this apparatus" as shown in FIG. 7 is inserted in received text data stored in the memory corresponding to the data area pointer of the body arrangement [0] of the mail arrangement [1] (2-56), and the "Color image processing disable" is set in the processing status of the mail arrangement [1] in FIG. 3. Information of "the presence of analysis disable data" is set in the processing result and processing status of the body arrangement [0] and the mail arrangement [1], and information "not erase" is set in the erasing mode (2-57). The CPU 10-3 develops a portion such as a header portion, which can be analyzed into image data, of the received e-mail data 2 (2-58). The process for all the parts of the e-mail data 2 is completed (2-59), and analysis development disable data is present. For this reason, the CPU 10-3 shifts to the process for the next e-mail data 3.

FIG. 7 is a view showing a print result of the second e-mail data (e-mail data 2).

The process for the third type of e-mail (facsimile image data that cannot be received because the amount of facsimile image data to be received is too large) will be described below.

In this case, in a check of the memory capacity (2-51), the empty memory capacity at this time is 227 kbyte, and the amount of e-mail data to be received is 500 kbyte. For this reason, the CPU 10-3 cannot receive all the data. Therefore, information "full memory" is set in the processing status of the mail arrangement [2], and information "not erase" is set in the erasing mode (2-53). Only the header portion (for example, text data up to "—Boundary—" in FIG. 4) of an e-mail is received (2-54). In addition, a message such as "Mail cannot be received due to full memory" is inserted in the text of the received mail data (2-56), information "memory full" is set in the processing result and processing status of the body arrangement [0] of the mail arrangement [2], and information "not erase" is set in the erasing mode (2-57), thereby executing the process of developing text data into image data (2-58). The process for all the parts of the e-mail data 3 is completed (2-59), all the data are not received and developed (2-60), the process of transmitting an erasing request (2-61) is skipped, and the processing of all the e-mail data is completed (2-51). For this reason, when the CPU 10-3 transmits the end request of e-mail data service to the e-mail server 1-3, and the CPU 10-3 receives an acknowledgement from the e-mail server 1-3, a connection canceling procedure is executed to end the process (2-13).

Note that a timing at which an erasing request is transmitted to the e-mail server 1-3 can be freely selected from a timing at which e-mail data is received, a timing at which the e-mail data is developed into facsimile image data, and a timing after the facsimile image data is normally printed.

Figure 13:
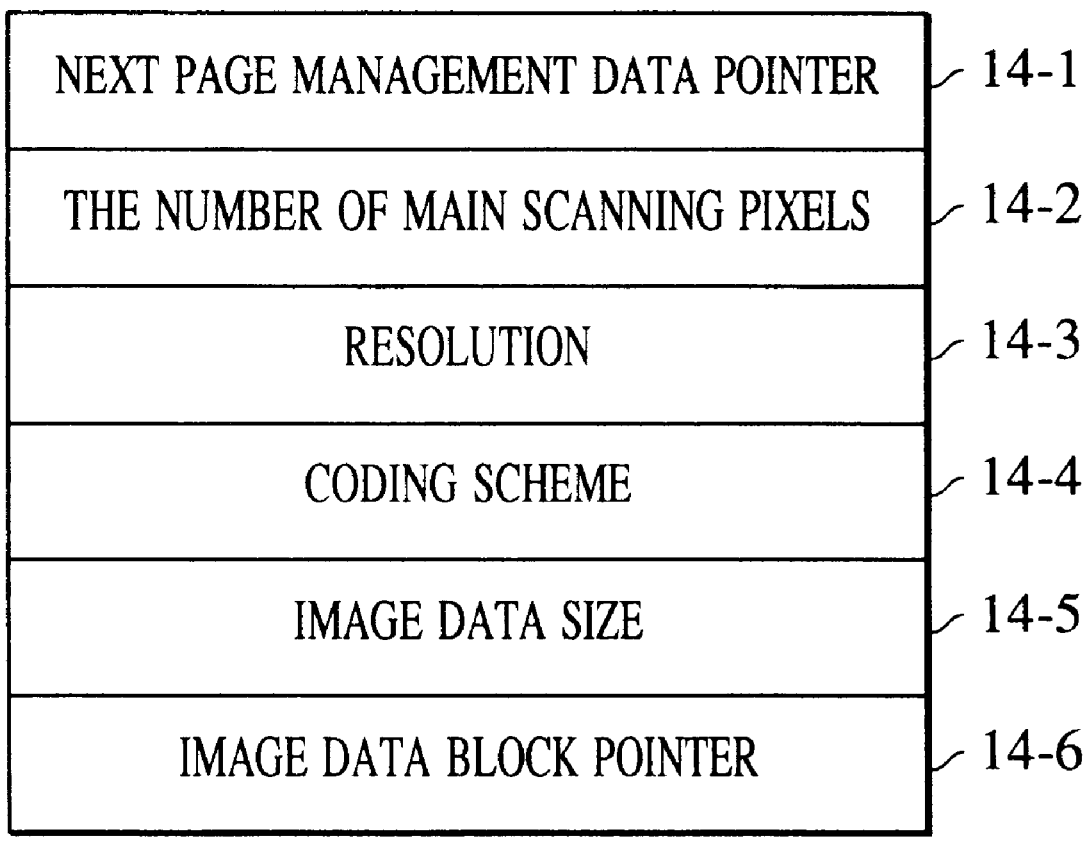
FIG. 13 is a view showing page management data for managing facsimile image data in units of pages.

FIG. 13 is a view showing page management data for managing facsimile image data in units of pages.

Reference numeral 14-1 denotes a NEXT page management data pointer which is page management data connected to the next page.

Reference numeral 14-2 denotes the number of main scanning pixels which is "1728 pixels" at an A4 standard resolution.

Reference numeral 14-3 denotes a resolution. The A4 standard resolution is "8×3.85 pel/mm".

Reference numeral 14-4 denotes a coding scheme. A necessary coding scheme is "MH (Modified Huffman)".

Reference numeral 14-5 denotes an image data size which indicates the number of bytes.

Reference numeral 14-6 denotes an image data block pointer which indicates the start address of an image data block chain in which facsimile image data is stored.

Figure 14:
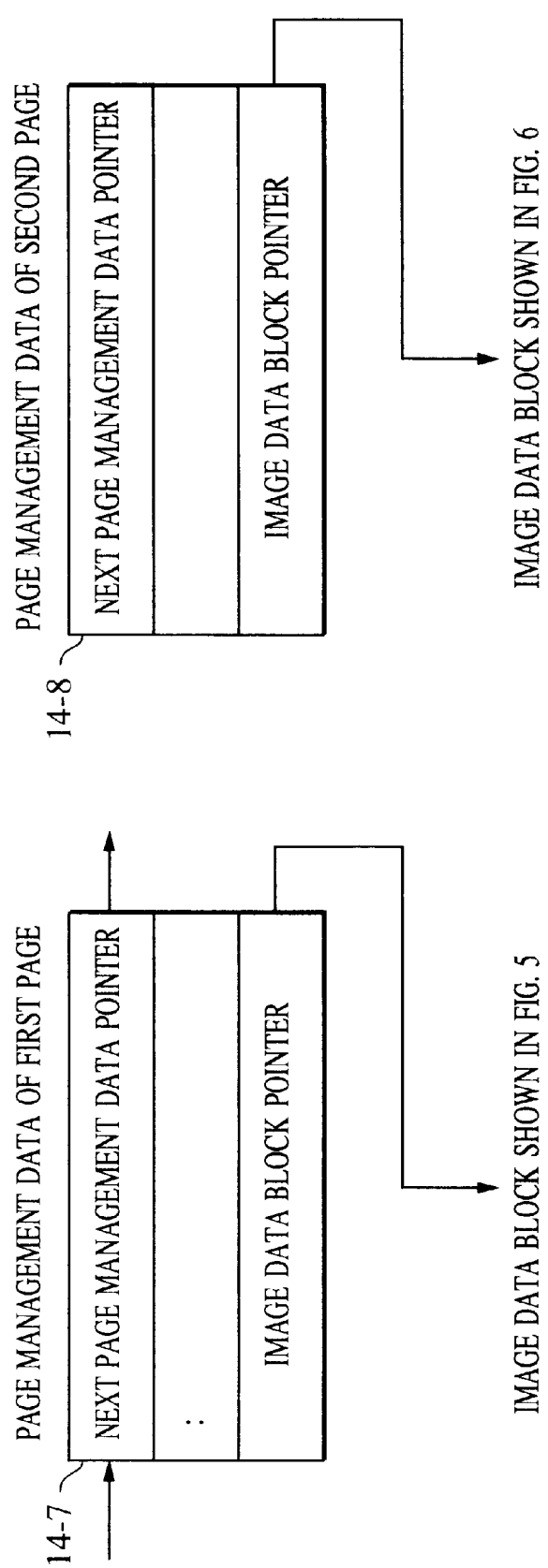
FIG. 14 is a view showing the relationship between page management data of the first page and page management data of the second page when the e-mail data is developed into facsimile image data.

Reference numerals 14-7 and 14-8 in FIG. 14 denote the relationship between the page management data of the first and second pages when the e-mail data in FIG. 4 is developed into facsimile image data. The first page corresponds to FIG. 5, and the second page corresponds to FIG. 6.

Execution of various processes set by each operator for e-mail data retrieved such that the e-mail facsimile apparatus 1-11 accesses the e-mail server 1-10 will be described below with reference to FIG. 9.

Figure 9:
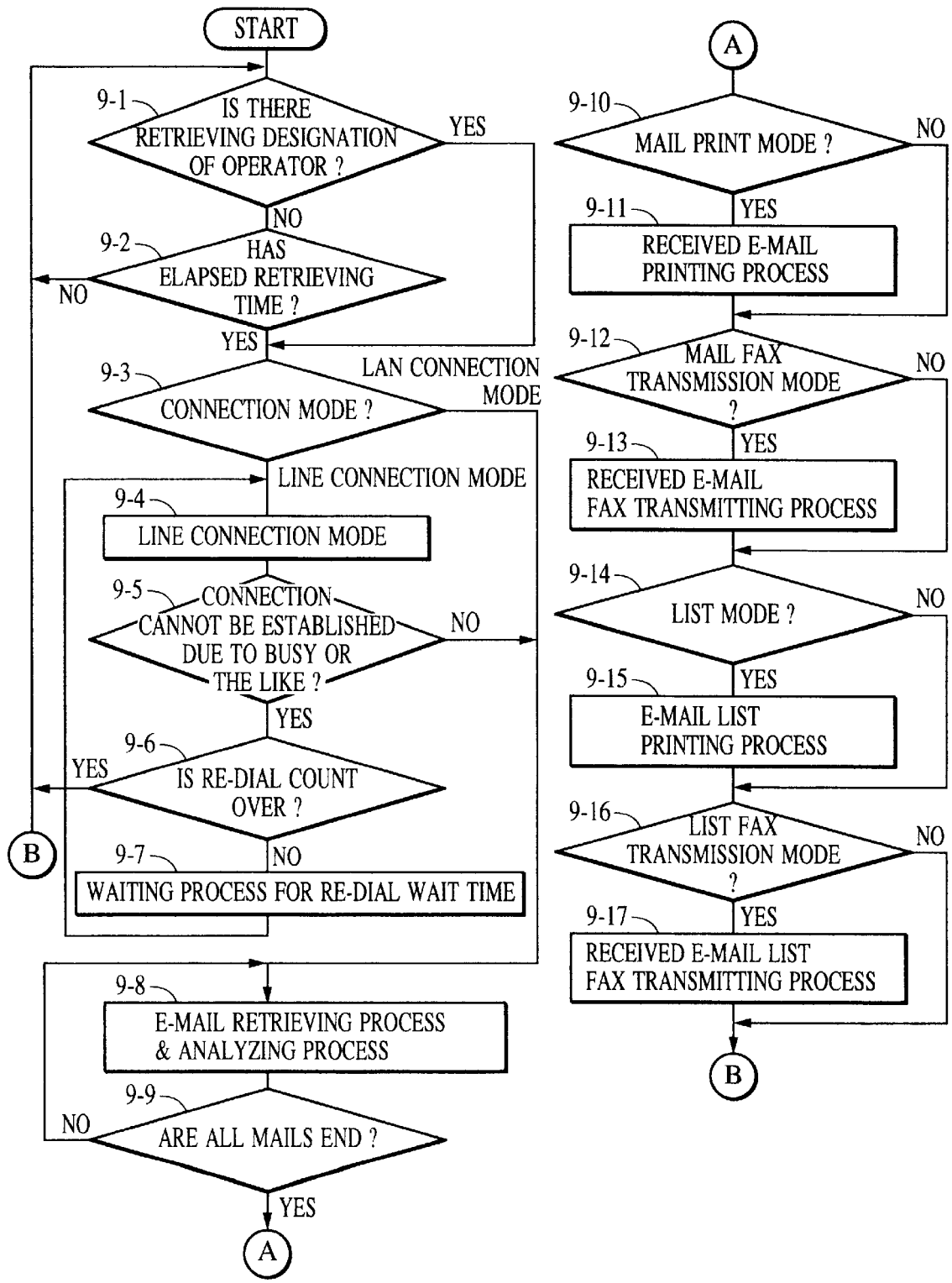
FIG. 9 is a flow chart showing an access process to an e-mail server and an output process of an e-mail list.

FIG. 9 is a flow chart showing a control operation executed by the CPU 10-3. A program for executing the processes of the flow is shown in the ROM 10-2.

The CPU 10-3 causes the controller 10-13 to determine the presence/absence of an input of a retrieving designation for e-mail data by an operator through the IO controller 10-8 (9-1). When the retrieving designation is not input, it is checked whether the present time is equal to a time at which a set e-mail is retrieved (9-2). If the retrieving designation is input by the operator, or the present time is the retrieving time, the CPU 10-3 checks whether a connection mode to the e-mail server 1-3 is a LAN connection mode or a line connection mode (9-3).

When the connection mode is a line connection mode, the CPU 10-3 causes the line I/F unit 10-6 to execute the line connecting process (calling process to the ISDN/PSTN) (9-4). As a result, it is checked whether a line connection is established or not due to a line busy state or the like (9-5). If the line connection is not established, it is checked whether a re-dial (re-calling) count is a predetermined count (regulated count which is set in advance) (9-6). If the re-calling count is the predetermined count, the connecting process is ended, the controller is caused to display that the connecting process is erroneously ended, the CPU 10-3 returns to a waiting state. If the re-calling count is not the predetermined count, a re-dial (re-calling) waiting process is performed for a predetermined period of time (9-7), and the line connecting process is performed for a predetermined period of time (9-4).

When the connection mode is a LAN connection mode, or line connection is completed, an e-mail data retrieving process described in FIG. 2 and an analyzing process are executed (9-8). If retrieving of all the e-mail data is completed (9-9), the information of a function mode set in the post office arrangement (FIG. 11) from which the e-mail data is retrieved is read, and it is determined whether a print process of the received e-mail data is executed (9-10), whether facsimile transmission of the received e-mail data is executed (9-12), whether a print process of list information of the received e-mail data is executed (9-14), or whether facsimile transmission of list information of the received e-mail data is executed (9-16).

When the function mode is received mail print, the CPU 10-3 causes the printer unit 10-11 to record (print) the received e-mail developed into the image data described in FIG. 2 through the IO controller 10-7 (9-11). In this manner, the image data are recorded as shown in FIGS. 4, 5, 6, and 7.

When the function mode is received mail FAX transmission, the CPU 10-3 causes the line I/F unit 10-6 to automatically dial a facsimile communication destination set in the received e-mail data or a facsimile communication destination of the post office arrangement, so that received e-mail data developed into image data is transmitted (9-13). In this manner, image data as shown in FIGS. 4, 5, 6, and 7 are transmitted.

When the function mode is received mail data list print, and the CPU 10-3 is set in a list mode, the CPU 10-3 forms the mail list data as shown in FIG. 8 with reference to the management data in FIG. 3. The mail list is developed into image data, and the printer unit 10-11 is caused to record and output the image data (9-15). In this manner, the list shown in FIG. 8 is recorded.

When the function mode is received mail list FAX transmission, and the CPU 10-3 is set in a list mode, the CPU 10-3 forms the mail list data shown FIG. 8 with reference to the management data in FIG. 3, and the CPU 10-3 develops the mail list data into image data and converts the image data into facsimile image data. The CPU 10-3 causes the line I/F unit 10-6 to automatically dial a facsimile communication destination in which received e-mail data is set or a facsimile communication destination of the post office arrangement, and mail list information converted into facsimile image data is transmitted as facsimile data (9-17). In this manner, the list information shown in FIG. 8 is transmitted.

The above e-mail facsimile apparatus 1-11 notifies the PC 1-5 of the processing result of the retrieved e-mail data through the remote router 1-8, the private line 1-6, the remote router 1-4, and the e-mail server 1-3. This notification process is executed in the following manner. That is, in transmission of e-mail data by the PC 1-5, when a processing result request for requesting the notification of the processing result is set in the e-mail data to be transmitted, and the e-mail facsimile apparatus 1-11 detects this request, the information of the processing result is generated.

According to the above e-mail facsimile apparatus, the facsimile apparatus can retrieve e-mail data from an e-mail server. Even a person who is inexperienced in computer operation can use the e-mail service.

A communication link between an e-mail server and a LAN through the ISDN/PSTN is established, a re-calling operation is automatically performed times which are equal or smaller in number than the predetermined count which is set in advance. For this reason, even if an operator does not input a retrieving destination each time the re-calling operation is performed, the operability of the apparatus for retrieving the e-mail data can be improved.

Since an e-mail list serving as the list of the header of e-mail data retrieved from the e-mail server is recorded and output, mail management can be easily performed, and the e-mail data can be reliably retrieved.

When the e-mail data retrieved from the e-mail server includes contents which cannot be interpreted by the e-mail facsimile apparatus, or when a memory capacity which can receive e-mail data cannot be assured, a message representing these cases is output to prevent the e-mail data from being erased from the e-mail server. For this reason, even when the operator retrieves an e-mail with another apparatus or retrieves e-mail data when the memory capacity is empty, the operator can obtain the e-mail data.

According to the e-mail facsimile apparatus according to this embodiment, in information transmission, a network system which can automatically and rapidly transmit information without any process by an operator can be provided. Therefore, an information transmission operation can be efficiently performed.

According to the system described above, communication can be performed at a communication fee which is considerably smaller than that used when facsimile multi-address transmission is performed with long-distance communication from the head office to respective branch offices.

When the e-mail facsimile apparatus according to this embodiment is shared by a plurality of users, a set function mode (processing mode) can be selected for each user, and an automatic process for the retrieved e-mail data can be performed in a function mode depending on the desire of each user.

For example, post offices for facsimile transmission and a printing operation are arranged in an e-mail server, received mail FAX transmission and received mail print are set as function modes corresponding to the post offices in the e-mail facsimile apparatus, post offices corresponding to the functions are designated as e-mail addresses on the e-mail transmission side. In this manner, various functions such as a facsimile transmission function and a remote print function can be realized by one communication apparatus.

An operator of an e-mail data transmission source can recognize the process states (states of facsimile transmission and print output) of the transmitted e-mail data can be recognized.

The present invention is not limited to the above embodiment, and various modifications of the present invention can be made effective within the scope of the present invention.

What is claimed is:

1. A communication apparatus for receiving electronic mail (e-mail) data, comprising:
    a connection circuit adapted for connecting said communication apparatus to a network, the network being one of local area and Internet networks;
    a setting circuit adapted for setting, in advance of data retrieval, one of a plurality of processing modes of e-mail data which is to be retrieved;
    a retrieving circuit adapted for retrieving the e-mail data from an e-mail server of the network;
    a processing circuit adapted for processing the e-mail data retrieved by said retrieving circuit in the processing mode set by said setting circuit; and
    a memory, wherein
    said processing circuit converts a format of the e-mail data to another data format,
    said setting circuit sets processing mode information in said memory in correspondence with post office information of the e-mail server, and
    said processing circuit reads, from said memory, processing mode information corresponding to a post office from which the e-mail data is retrieved by said retrieving circuit, and processes the e-mail data in a processing mode corresponding to the read processing mode information.

2. A communication apparatus according to claim 1, wherein said processing circuit processes an interpretable part of the e-mail data retrieved by said retrieving circuit.

3. A communication apparatus according to claim 2, wherein, when the retrieved e-mail data includes data that cannot be interpreted, said processing circuit generates a message indicating a presence of non-interpreted data.

4. A communication apparatus according to claim 3, further comprising a memory, wherein when a memory capacity of the memory is insufficient to receive the e-mail data, said processing circuit generates a message representing that the memory capacity is insufficient and processes header information of the e-mail data.

5. A communication apparatus according to claim 4, wherein, when the retrieved e-mail data includes data that cannot be interpreted, or when the memory capacity is insufficient, said communication apparatus does not request the e-mail server to erase the e-mail data.

6. A communication apparatus according to claim 1, wherein the processing modes include a first mode for developing the retrieved e-mail data into image data for subsequent transmission, such that, when in the first mode, said processing circuit converts an interpretable part of the e-mail data retrieved by the retrieving means into image data.

7. A communication apparatus according to claim 6, wherein said processing circuit includes a calling circuit adapted for performing a calling operation to a predetermined communication destination, and a transmitter for transmitting the image data to the destination as facsimile data.

8. A communication apparatus according to claim 7, wherein the calling circuit performs the calling operation according to communication destination information described in the retrieved e-mail data.

9. A communication apparatus according to claim 7, wherein the calling circuit performs the calling operation according to communication destination information set by said setting circuit.

10. A communication apparatus according to claim 7, wherein the calling circuit performs the calling operation according to communication destination information described in the retrieved e-mail data or communication destination information set by said setting circuit, and uses the communication destination information described in the retrieved e-mail data when the communication destination information is described in the retrieved e-mail data.

11. A communication apparatus according to claim 1, wherein the processing modes include a second mode for developing the retrieved e-mail data into image data for subsequent recording and outputting, such that, when in the second mode, said processing circuit develops an interpretable part of the e-mail data retrieved by the retrieving means into image data.

12. A communication apparatus according to claim 1, wherein the processing modes include a third mode for developing list information of the retrieved e-mail data into image data for subsequent recording and outputting, such that, when in the third mode, said processing circuit forms the list information from the retrieved e-mail data and develops the formed list information into image data.

13. A communication apparatus according to claim 12, wherein said processing circuit extracts information of a header portion of the retrieved e-mail data to form text data of the list information, and converts the formed text data of the list information into image data.

14. A communication apparatus according to claim 1, wherein the processing modes include a fourth mode for developing list information of the retrieved e-mail data into image data for subsequent transmission, such that, when in the fourth mode, said processing circuit forms the list information from the retrieved e-mail data and develops the formed list information into image data.

15. A communication apparatus according to claim 1, wherein
said memory stores processing mode information corresponding to a plurality of post offices, and
said setting circuit respectively sets different processing information for the plurality of post offices.

16. A communication apparatus according to claim 1, wherein
said memory stores post office information, for respectively accessing post offices opened for users who use the e-mail servers and processing mode information corresponding to the post office information, and
said retrieving circuit retrieves e-mail data from the e-mail server according to the post office information stored in said memory.

17. A communication apparatus according to claim 16, wherein said memory stores communication destination information to be transmitted as image data.

18. A communication apparatus according to claim 1, wherein said retrieving circuit retrieves e-mail data from the e-mail server according to a manual operation.

19. A communication apparatus according to claim 1, wherein said retrieving circuit periodically retrieves e-mail data from the e-mail server.

20. A communication apparatus according to claim 1, further comprising a generator circuit adapted for generating information representing a processing result of the e-mail data processed by said processing circuit and for notifying a destination that has retrieved the e-mail data of the processing result information.

21. A method of processing electronic mail (e-mail) data, comprising the steps of:
connecting to a network, the network being one of local area and Internet networks;
setting, in advance of data retrieval, one of a plurality of processing modes of e-mail data that is to be retrieved;
retrieving the e-mail data from an e-mail server of the network; and
processing the retrieved e-mail data in the set processing mode, wherein
said processing step includes converting a format of the e-mail data to another data format,
processing mode information is set in a memory in correspondence with post office information of the e-mail server,
the processing mode information corresponding to a post office from which the e-mail data is retrieved is read from the memory, and
the e-mail data is processed in a processing mode corresponding to the read processing mode information.

22. A method according to claim 21, wherein said processing step processes an interpretable part of the retrieved e-mail data.

23. A method according to claim 22, wherein, when the retrieved e-mail data includes data that cannot be interpreted, said processing step generates a message indicating a presence of non-interpreted data.

24. A method according to claim 23, wherein when a memory capacity of a memory is insufficient to retrieve the e-mail data, a message indicating that the memory capacity is insufficient is generated and said processing step processes header information of the e-mail data.

25. A method according to claim 24, wherein when the e-mail data retrieved from the e-mail server includes data that cannot be interpreted, or when the memory capacity is insufficient, the e-mail server is requested to erase the e-mail data.

26. A method according to claim 21, wherein the processing modes include a first mode for developing the retrieved e-mail data into image data for subsequent transmission, such that, when in the first mode, an interpretable part of the retrieved e-mail data is converted into image data.

27. A method according to claim 26, further comprising the step of performing a calling operation to a predetermined communication destination, wherein the image data is transmitted to the destination as facsimile data.

28. A method according to claim 27, wherein the calling operation is performed according to communication destination information described in the retrieved e-mail data.

29. A method according to claim 27, wherein the calling operation is performed according to communication destination information set in said setting step.

30. A method according to claim 27, wherein the calling operation is performed according to communication destination information described in the retrieved e-mail data or communication destination information set in said setting step, and the calling operation is performed by using the communication destination information described in the retrieved e-mail data when the communication destination information is described in the retrieved e-mail data.

31. A method according to claim 21, wherein the processing modes include a second mode for developing the retrieved e-mail data into image data for subsequent recording and outputting, such that, when in the second mode, an interpretable part of the retrieved e-mail data is developed into image data.

32. A method according to claim 21, wherein the processing modes include a third mode for developing list information of the retrieved e-mail data into image data for subsequent recording and outputting, such that, when in the third mode, the list information is formed from the retrieved e-mail data, and the formed list information is developed into image data.

33. A method according to claim 32, wherein said processing step extracts information of a header portion of the retrieved e-mail data to form text data of the list information, and the formed text data of the list information is converted into image data.

34. A method according to claim 21, wherein the processing modes include a fourth mode for developing list information of the retrieved e-mail data into image data for subsequent transmission, such that, when in the fourth mode, the list information is formed from the e-mail data, and the formed list information is developed into image data.

35. A method according to claim 21, wherein the memory stores processing mode information corresponding to a plurality of post offices, and said setting step respectively sets different processing information for the plurality of post offices.

36. A method according to claim 35, wherein
the memory stores post office information for accessing post offices opened for users who use the e-mail servers and processing mode information corresponding to the post office information, and said retrieving step retrieves e-mail data from the e-mail server according to the post office information stored in the memory.

37. A method according to claim 36, wherein the memory stores communication destination information to be transmitted as image data.

38. A method according to claim 21, wherein e-mail data is retrieved from the e-mail server according to a manual operation.

39. A method according to claim 21, wherein said retrieving step retrieves e-mail data from the e-mail server.

40. A method according to claim 21, wherein information representing a processing result of the processed e-mail data is generated, and the generated processing result information is transmitted to a destination that has retrieved the e-mail data.

* * * * *

UNITED STATES PATENT AND TRADEMARK OFFICE
CERTIFICATE OF CORRECTION

PATENT NO. : 6,141,695
DATED : October 31, 2000
INVENTOR(S) : Kenzou Sekiguchi, et. al It is certified that error appears in the above-identified patent and that said Letters Patent is hereby corrected as shown below:

SHEET 4

Figure 3, "CAPASITY" should read --CAPACITY--.

COLUMN 4

Line 1, "compression/extension" should read
     --compression/expansion--.

COLUMN 15

Line 25, "servers" should read --server,--.

COLUMN 16

Line 65, "servers" should read --server,--.

Signed and Sealed this

Twenty-second Day of May, 2001

Attest:

NICHOLAS P. GODICI

Attesting Officer     Acting Director of the United States Patent and Trademark Office